(12) United States Patent
Cairoli et al.

(10) Patent No.: US 11,264,790 B2
(45) Date of Patent: Mar. 1, 2022

(54) SOLID STATE CIRCUIT BREAKER USING RB-IGCTS

(71) Applicant: ABB Schweiz AG, Baden (CH)

(72) Inventors: Pietro Cairoli, Cary, NC (US); Davide Leoni, Trescore Balneario (IT); Luca Raciti, Bergamo (IT)

(73) Assignee: ABB SCHWEIZ AG, Baden (CH)

( * ) Notice: Subject to any disclaimer, the term of this patent is extended or adjusted under 35 U.S.C. 154(b) by 135 days.

(21) Appl. No.: 16/707,426

(22) Filed: Dec. 9, 2019

(65) Prior Publication Data

US 2020/0185905 A1 Jun. 11, 2020

Related U.S. Application Data

(60) Provisional application No. 62/776,505, filed on Dec. 7, 2018.

(51) Int. Cl.
*H02H 3/10* (2006.01)
*H02H 1/00* (2006.01)

(52) U.S. Cl.
CPC ............ *H02H 3/10* (2013.01); *H02H 1/0007* (2013.01)

(58) Field of Classification Search
CPC ........... G01R 19/175; H01H 2009/543; H01H 2009/544; H01H 2009/545;
(Continued)

(56) References Cited

U.S. PATENT DOCUMENTS

| 5,650,901 | A | * | 7/1997 | Yamamoto | H01H 9/542 361/100 |
|---|---|---|---|---|---|
| 6,104,106 | A | | 8/2000 | Partridge | |
| 6,768,223 | B2 | | 7/2004 | Powell et al. | |
| 7,405,910 | B2 | | 7/2008 | Maitra et al. | |
| 8,742,628 | B2 | | 6/2014 | Urciuoli | |
| 8,853,887 | B2 | | 10/2014 | Silberbauer et al. | |

(Continued)

FOREIGN PATENT DOCUMENTS

| CN | 108574271 B | 10/2019 |
|---|---|---|
| JP | S5721130 A | 2/1982 |

(Continued)

OTHER PUBLICATIONS

Francesco Agostini "1 MW bi-directional DC solid state circuit breaker based on air cooled reverse blocking-IGCT". IEEE Xplore Digital Library [online], ieeexplore.ieee.org [retrieved on Apr. 30, 2015], Retrieved from the Internet: https://ieeexplore.ieee.org/stamp/stamp.jsp?tp=&arnumber=71 (Year: 2015).*

(Continued)

*Primary Examiner* — Jared Fureman
*Assistant Examiner* — Nicolas Bellido
(74) *Attorney, Agent, or Firm* — Greenberg Traurig, LLP

(57) ABSTRACT

Systems, methods, techniques and apparatuses of power switches are disclosed. One embodiment is a power switch comprising a first reverse blocking integrated gate-commutated thyristor (RB-IGCT); a second RB-IGCT coupled in an
(Continued)

antiparallel configuration with the first RB-IGCT; a transient voltage suppressor coupled in parallel with the first RB-IGCT and the second RB-IGCT; and a controller. The controller is structured to determine a direction of a current flowing through the power switch, determine a magnitude of the current flowing through the power switch exceeds a threshold, and turn off the one of the first RB-IGCT and the second RB-IGCT receiving a current flowing in a reverse direction in response to determining the magnitude of the current flowing through the power switch exceeds the threshold.

16 Claims, 8 Drawing Sheets

(58) Field of Classification Search
CPC ............. H01H 2300/03; H01H 33/593; H01H 33/596; H01H 71/04; H01H 9/54; H01H 9/56; H01L 2924/1301; H01L 2924/13023; H01L 2924/13026; H01L 2924/13027; H01L 2924/13028; H01L 2924/13033; H02H 1/0007; H02H 1/063; H02H 3/021; H02H 3/05; H02H 3/08; H02H 3/087; H02H 3/093; H02H 3/10; H02H 3/33; H02H 9/02; H02M 7/21; H02M 7/217; H03K 17/13; H03K 17/136; H03K 17/16
See application file for complete search history.

(56) References Cited

U.S. PATENT DOCUMENTS

| | | | |
|---|---|---|---|
| 2016/0344384 A1* | 11/2016 | Hague | .................. H03K 17/735 |
| 2019/0199127 A1* | 6/2019 | Gavrilov | ................. H02J 9/062 |
| 2020/0203255 A1* | 6/2020 | Tschida | .............. H05K 7/20309 |

FOREIGN PATENT DOCUMENTS

| | | | |
|---|---|---|---|
| JP | 08228435 A | * | 9/1996 |
| WO | 2012038101 A1 | | 3/2012 |

OTHER PUBLICATIONS

Hassan Muazu "Overview of Solid State Circuit Breaker Technology and Some Recent Experiment Prototypes"; 4 pgs. IEEE Xplore Digital Library [online], ieeexplore.ieee.org [retrieved on Apr. 3, 2018], Retrieved from the Internet: https://ieeexplore.ieee.org/stamp/stamp.jsp?tp=&arnumber=8333320 (Year: 2018).*

L. Qi Solid State Circuit Breaker Based DC Shipboard Distribution Protection; p. 1-6. IEEE Xplore Digital Library [online], ieeexplore.ieee.org [retrieved on Dec. 19, 2016], Retrieved from the Internet: https://ieeexplore.ieee.org/stamp/stamp.jsp?tp=& arnumber=7795020 (Year: 2016).*

Agostini et al., "1MW Bi-Directional DC Solid State Circuit Breaker Base on Air Cooled Reverse Blocking-IGCT", Jun. 21, 2015, 6 pgs., IEEE Electric Ship Technologies Symposium (ESTS).

Meyer et al., "Solid-State Circuit Breaker Based on Active Thyristor Topologies", Mar. 6, 2006, 9 pgs., IEEE Transaction on Power Electronics, vol. 21, No. 2.

* cited by examiner

SOLID STATE CIRCUIT BREAKER USING RB-IGCTS

CROSS REFERENCE TO RELATED APPLICATION

This application claims priority under 35 U.S.C. 119(e) from U.S. Provisional patent application No. 62/776,505 filed on Dec. 7, 2018, entitled "SOLID STATE CIRCUIT BREAKER USING RB-IGCTS" which is hereby incorporated by reference in its entirety.

BACKGROUND

The present disclosure relates generally to power switches such as solid state circuit breakers. Power systems need protection from fault currents that can damage power electronics converters, energy storage systems, capacitor banks, and other devices. Solid state circuit breakers can provide ultra-fast fault protection, load connection, and disconnection for a large variety of power critical applications. Existing solid state circuit breakers suffer from a number of shortcomings and disadvantages. There remain unmet needs including reducing device cost and reducing power losses during non-fault condition operations. For example, conventional solid state circuit breakers are costlier and incur higher conduction losses than traditional electromechanical circuit breakers. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for solid state circuit breakers. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
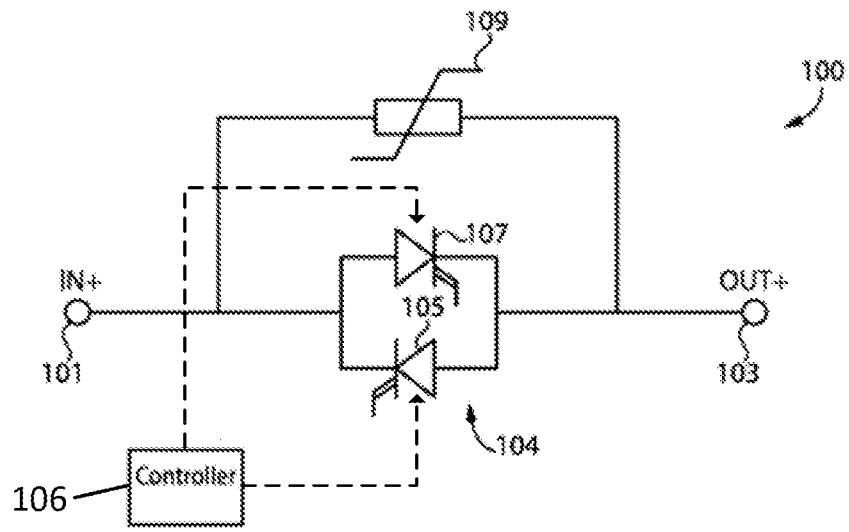
FIGS. 1-2 are circuit diagrams illustrating exemplary solid state circuit breakers.

With reference to FIG. 1, there is illustrated an exemplary solid state circuit breaker (SSCB) 100. It shall be appreciated that SSCB 100 may be implemented in a variety of applications, including low voltage DC power distribution systems, medium voltage DC power distribution systems, AC distribution systems, data centers, and shipboard power systems, to name but a few examples. In certain embodiments, low voltage may include any voltage less than 1500 V and medium voltage may include a range of voltages between 1500V and 73 kV. In certain embodiments, SSCB 100 may instead be another type of power switch including a solid state contactor, a status transfer switch, a utility disconnect switch, tie interconnect switch, bypass switch, another type of power switch structured to protect against faults, or another type of power switch structured to couple a power source to a load, to name but a few examples.

SSCB 100 includes a transient voltage suppressor 109 coupled in parallel with a semiconductor switch configuration 104 between terminals 101 and 103. In the illustrated embodiment, transient voltage suppressor 109 is a metal oxide varistor. In other embodiments, suppressor 109 may be a transient voltage suppression diode, a transient voltage suppression thyristor, or another device or plurality of devices structured to suppress transient voltages.

Semiconductor switch configuration 104 includes a reverse blocking integrated gate-commutated thyristor (RB-IGCT) 107 coupled in an antiparallel configuration with RB-IGCT 105 between terminals 101 and 103. RB-IGCTs 105 and 107 are operated so as to allow or block current flowing between terminals 101 and 103. SSCB 100 is bidirectional, so current may flow from terminal 101 to 103, or from terminal 103 to 101. When turned on, current may flow through RB-IGCTs 105 and 107 in a forward direction or a reverse direction. Current flowing in a forward direction through RB-IGCT 105 flows from terminal 103 to terminal 101. Current flowing in a forward direction through RB-IGCT 107 flows from terminal 101 to terminal 103. Current flowing in a reverse direction through RB-IGCT 105 flows from terminal 101 to terminal 103. Current flowing in a reverse direction through RB-IGCT 107 flows from terminal 103 to terminal 101.

Semiconductor switch configuration 104 includes RB-IGCTs rather than other switches such as thyristors, insulated-gate bipolar transistor (IGBT), or electro-mechanical switches. Compared to IGBTs and other semiconductor devices, RB-IGCTs have 70% less power loss, less energy consumption, less emission, and higher efficiency. Compared to thyristors, RB-IGCTs are structured to turn off at high currents. Unlike an electromechanical switch, an RB-IGCT does not generate an arc or dangerous conductive gasses during current interruption.

SSCB 100 includes a controller 106 structured to measure electric characteristics of SSCB 100 and operate RB-IGCTs 105 and 107. For example, controller 106 is structured to determine a direction of current flowing through SSCB 100, determine a magnitude of a current flowing through SSCB 100 exceeds an ON threshold, and turn off the one of RB-IGCT 105 and 107 receiving current flowing in a reverse direction in response to determining the magnitude of the current flowing through the SSCB exceeds the threshold.

Controller 106 is structured to operate RB-IGCTs 105 and 107 by transmitting a first control signal to RB-IGCT 105 and a second control signal to RB-IGCT 107. Controller 106 is structured to generate the first and second control signals effective to minimize the conduction and switching power loss of SSCB 100, and increase the reliability of the SSCB 100.

Controller 106 may include one or more measuring devices structured to measure electrical characteristics of SSCB. For example, controller 106 may include voltage sensors to measure a differential voltage across RB-IGCTs 105 or RB-IGCT 107, or a current sensor to measure a magnitude of current flowing between terminals 101 and 103. Controller 106 may be located proximate to SSCB 100 or remotely from the other components of SSCB 100. For example, SSCB 100 may include a communication device structured to communicate with a remote controller 106 such as a cloud system. It shall be appreciated that any or all of the foregoing features of SSCB 100 may also be present in the other SSCBs disclosed herein, such as SSCB 200 in FIG. 2

Figure 2:
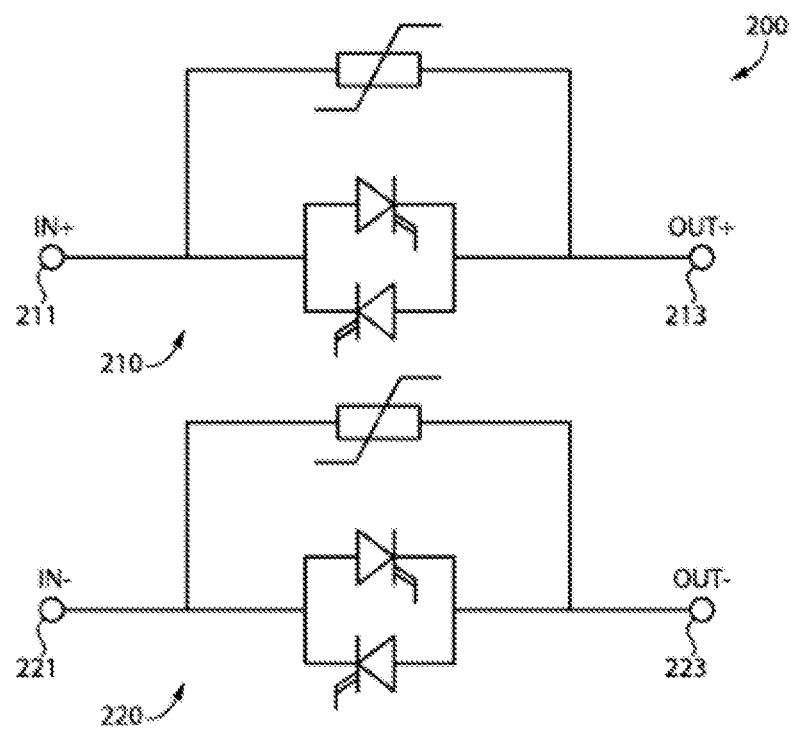

With reference to FIG. 2, there is illustrated an exemplary dual-pole SSCB 200 including RB-IGCTs coupled in an antiparallel configuration. Dual-pole SSCB 200 includes single-pole SSCB 210 coupled between positive pole terminals 211 and 213 and single-pole SSCB 220 coupled between negative pole terminals 221 and 223. Each single-pole SSCB of dual-pole 200 includes the features described with respect to SSCB 100 in FIG. 1.

Figure 3:
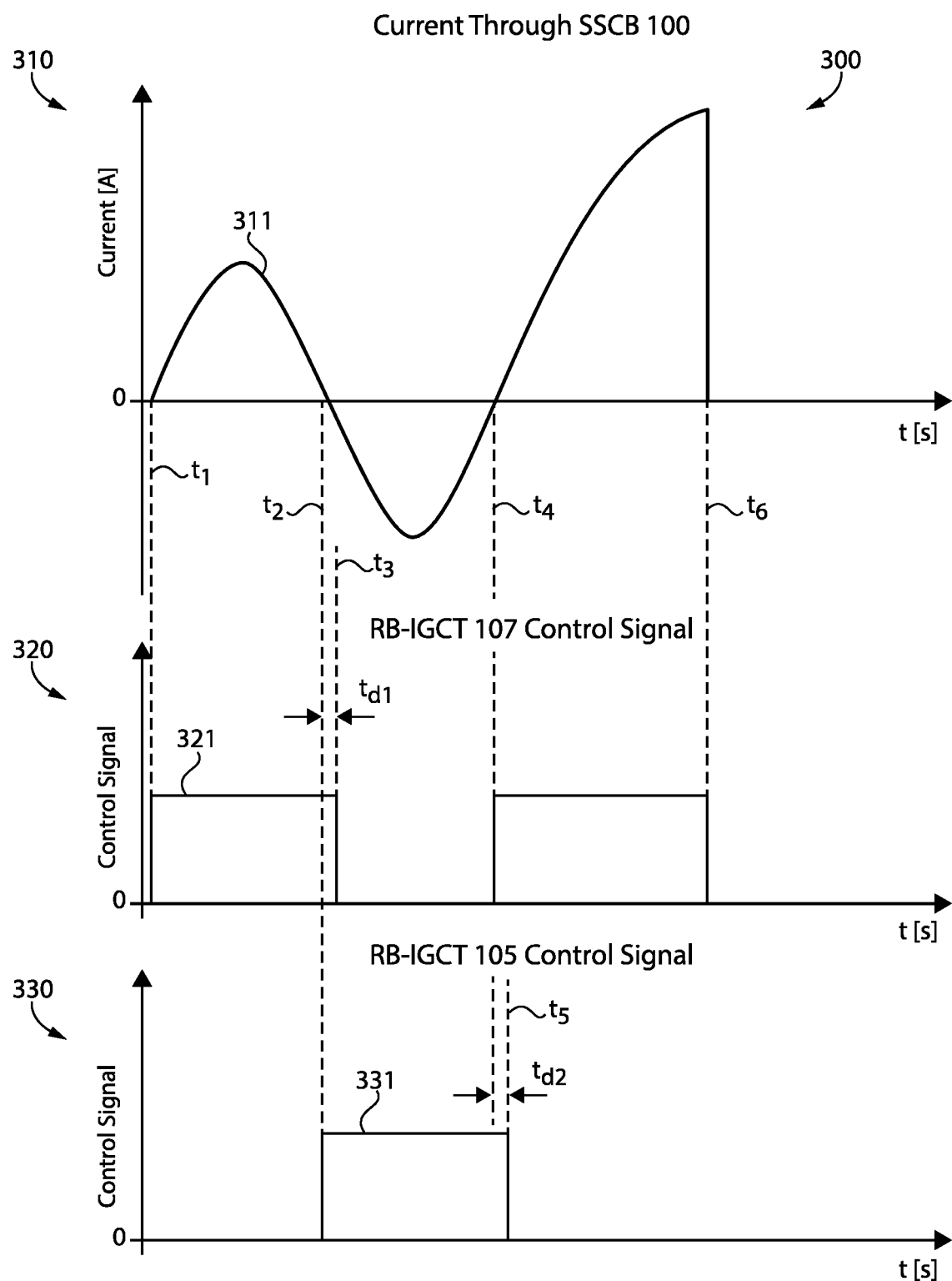
FIG. 3 is a graph illustrating electrical characteristics of an exemplary solid state circuit breaker.

With reference to FIG. 3, there is illustrated a plurality of graphs 300 corresponding to electrical characteristics of SSCB 100 in FIG. 1. The plurality of graphs 300 includes graph 310 illustrating current flow over time through SSCB 100, graph 320 illustrating the control signal transmitted to RB-IGCT 107, and graph 330 illustrating the control signal transmitted to RB-IGCT 105. Each control signal comprises sections at a low value and sections at a high value. When the control signal is low, the corresponding RB-IGCT is turned off. When the control signal is high, the corresponding RB-IGCT is turned on.

Graph 310 includes current magnitude line 311. As current flowing from terminal 101 to terminal 103 increases, line 311 is positive and increasing. As current flowing from terminal 103 to terminal 101 increases, line 311 is negative and decreasing. Graph 320 includes a control signal line 321. Graph 330 includes a control signal line 331. When current flows from terminal 101 to 103, RB-IGCT 107 is the forward RB-IGCT and RB-IGCT 105 is the reverse RB-IGCT. When current flows from terminal 103 to 101, RB-IGCT 105 is the forward RB-IGCT and RB-IGCT 107 is the reverse RB-IGCT.

At $t_1$, current is zero and RB-IGCT 107 is turned on. Current remains positive until $t_2$, when RB-IGCT 105 is turned on. After $t_2$, current becomes negative. RB-IGCT 107 turns off at $t_3$ after a delay $t_{d1}$. At $t_4$, current is zero and RB-IGCT 107 is turned on again. At $t_5$, RB-IGCT 105 is turned off after a delay $t_{d2}$. At $t_6$, RB-IGCT 107 is turned off in response to controller 106 determining a fault current is flowing through SSCB 100. Since both RB-IGCTs 105 and 107 are turned off, current decreases to zero. In certain embodiments, SSCB responds to a fault condition in less than 1 millisecond.

With reference to FIGS. 4-9, there are flowcharts illustrating variations of an exemplary control process performed by controller 106 of SSCB 100 in FIG. 1. Because of the challenges in operating RB-IGCTs in an antiparallel configuration, processes 400-900 are executed to guarantee reliable operation of the SSCBs presented herein that can provide a cost effective solution while minimizing conduction power loss. It is to be understood, however, that the exemplary processes may be used in combination with other forms of SSCBs, such as those described above with reference to FIG. 2. The exemplary processes may be implemented in whole or in part in one or more of the controllers disclosed herein. It shall be further appreciated that a number of variations and modifications to the exemplary processes are contemplated, including: the omission of one or more aspects of the exemplary processes, the combination of multiple exemplary processes, the addition of further conditionals and operations, and/or the reorganization or separation of operations and conditionals into separate processes, to name but a few examples. As shown in each of the following flowcharts, the controller operates the SSCB in response to received commands. The received commands may be transmitted by a trip unit because a fault was detected, or may be transmitted by a user, to name but a few examples.

Figure 4:
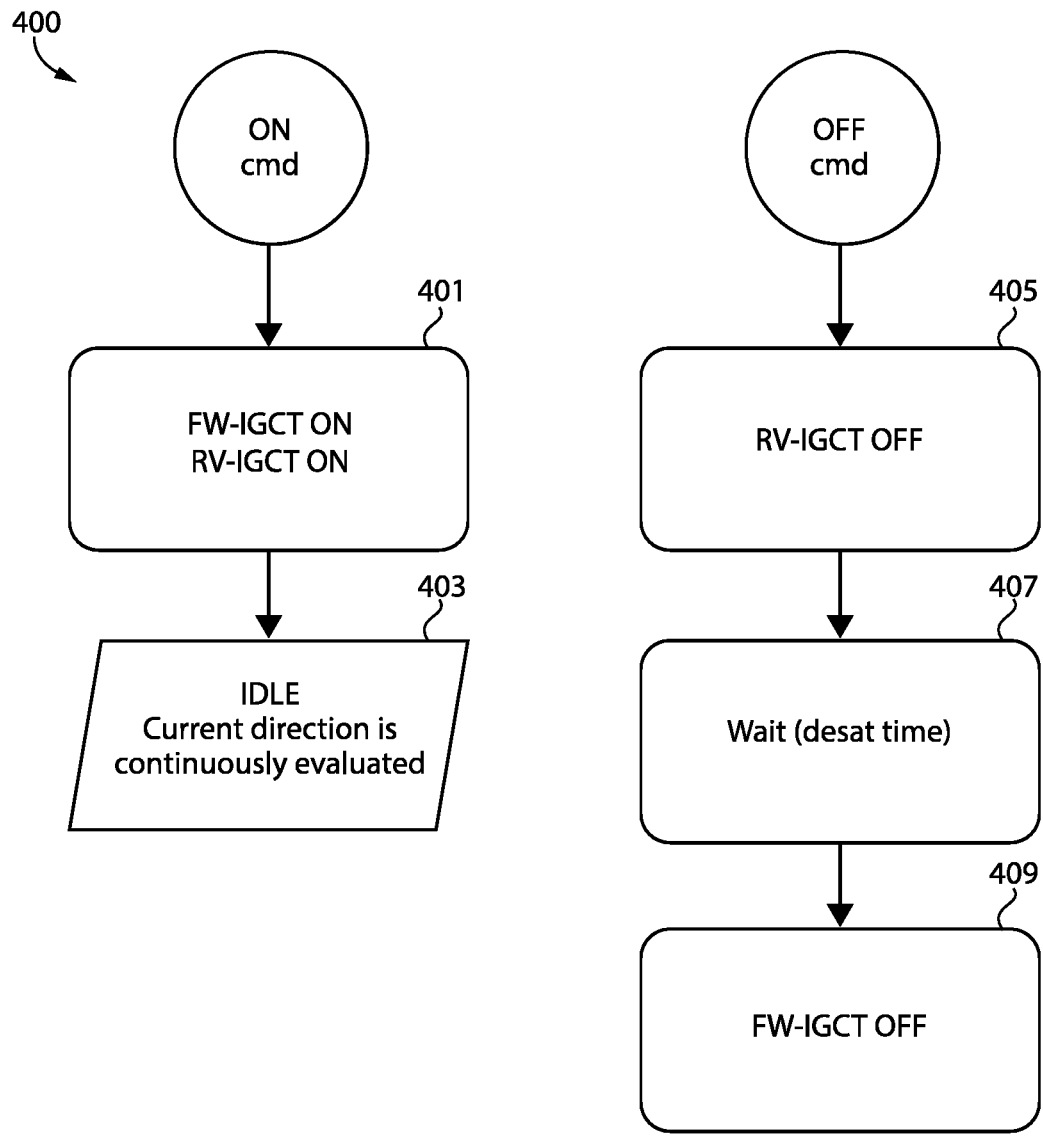
FIGS. 4-9 are flowcharts illustrating exemplary solid state circuit breaker operation processes.

With reference to FIG. 4, there is illustrated an exemplary process 400 to open and close SSCB 100. To close SSCB 100, process 400 begins at operation 401 where RB-IGCTs 105 and 107 are turned on. Process 400 then proceeds to operation 403 where controller 106 monitors current direction regularly. Controller 106 may monitor current direction regularly by continuously or periodically measuring current and determining a current direction. To open SSCB 100, process 400 proceeds to operation 405 where the RB-IGCT receiving current in a reverse direction, also known as the reverse RB-IGCT, is turned off. Process 400 then proceeds to operation 407 where controller 106 waits for a delay of a time period required for the reverse direction RB-IGCT to completely deplete all the charge stored when it was first turned-on. Process 400 then proceeds to operation 409 where the RB-IGCT receiving current in a forward direction, also known as the forward RB-IGCT, is turned off.

Figure 5:
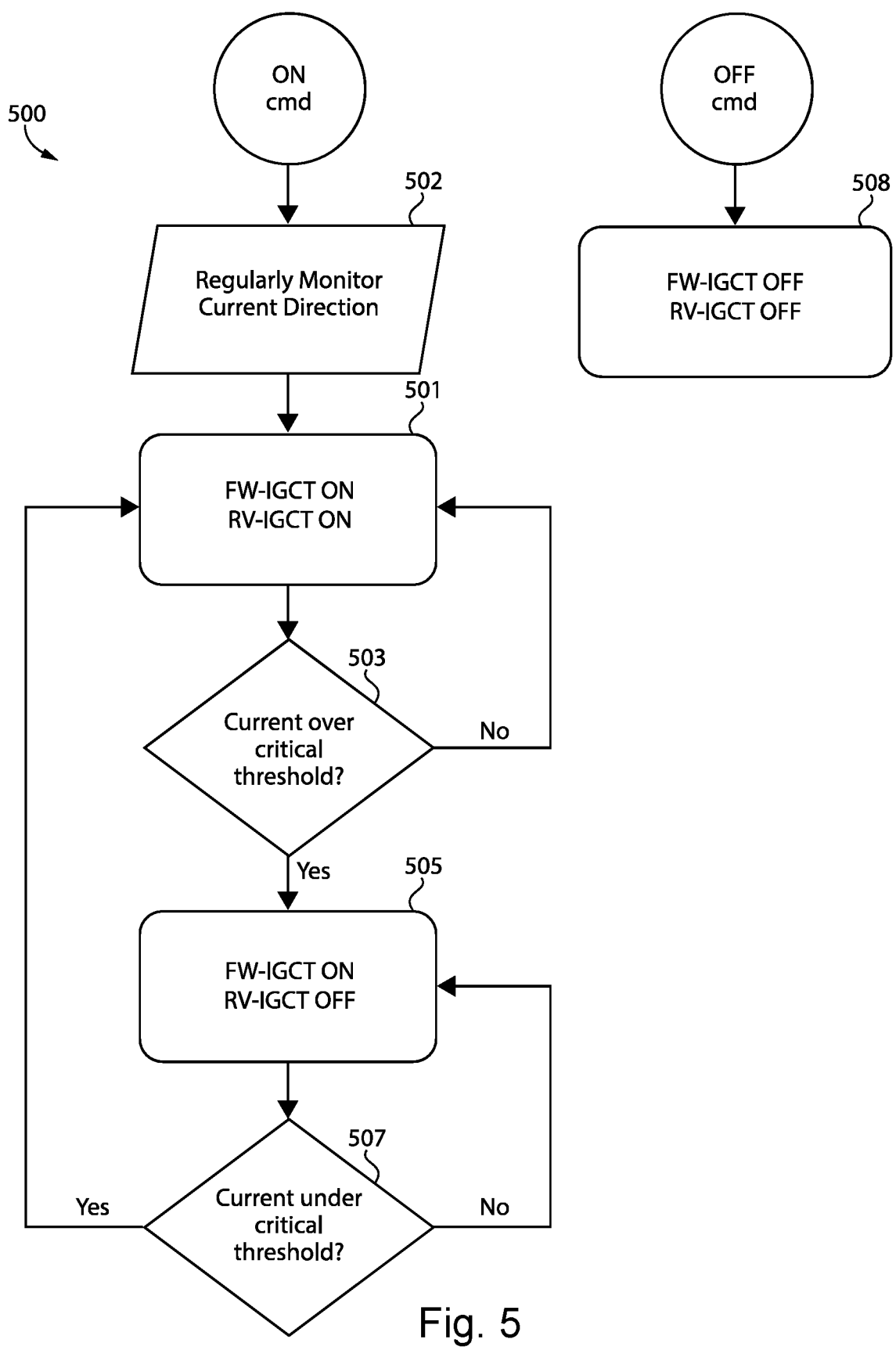

With reference to FIG. 5, there is illustrated an exemplary process 500 to open and close SSCB 100. To close SSCB 100, process 500 begins at operation 502 where controller 106 regularly determines current direction for the duration of process 500. Controller 106 may regularly determine current direction by continuously or periodically measuring current and determining current direction using the measured current. For subsequent operations in process 500 where an RB-IGCT is operated depending on whether the RB-IGCT is a forward RB-IGCT or a reverse RB-IGCT, the operation uses the most recent current direction determination.

Process 500 then proceeds to operation 501 where RB-IGCTs 105 and 107 are turned on and controller 106 determines which RB-IGCT is the forward RB-IGCT and which RB-IGCT is the reverse RB-IGCT. Process 500 then proceeds to conditional 503 where controller 106 determines whether a current magnitude exceeds a first threshold. For example, the first threshold may be in a range of 50%-110% of the nominal rated current flowing through SSCB 100. If current does not exceed a threshold, process 500 returns to operation 501. If current does exceed the threshold, process 500 proceeds to operation 505 where the reverse RB-IGCT is turned off. Process 500 then proceeds to conditional 507 where controller 106 determines whether current is less than a second threshold. For example, the second threshold may be in a range of 40%-100% of the nominal rated current flowing through SSCB 100, a range different than that of the first threshold in order to provide hysteresis and avoid jittering or unnecessary continuous turn-off and turn-on. If current is under the threshold, process 500 proceeds to operation 501. If current is not less than the threshold, process 500 returns to operation 505.

To open SSCB 100, process 500 executes operation 508 where RB-IGCTs 105 and 107 are turned off. In certain embodiments, turning off the forward RB-IGCT 107 is delayed for a time period required for the reverse RB-IGCT 105 to completely deplete all the charge stored for load switching.

Figure 6:
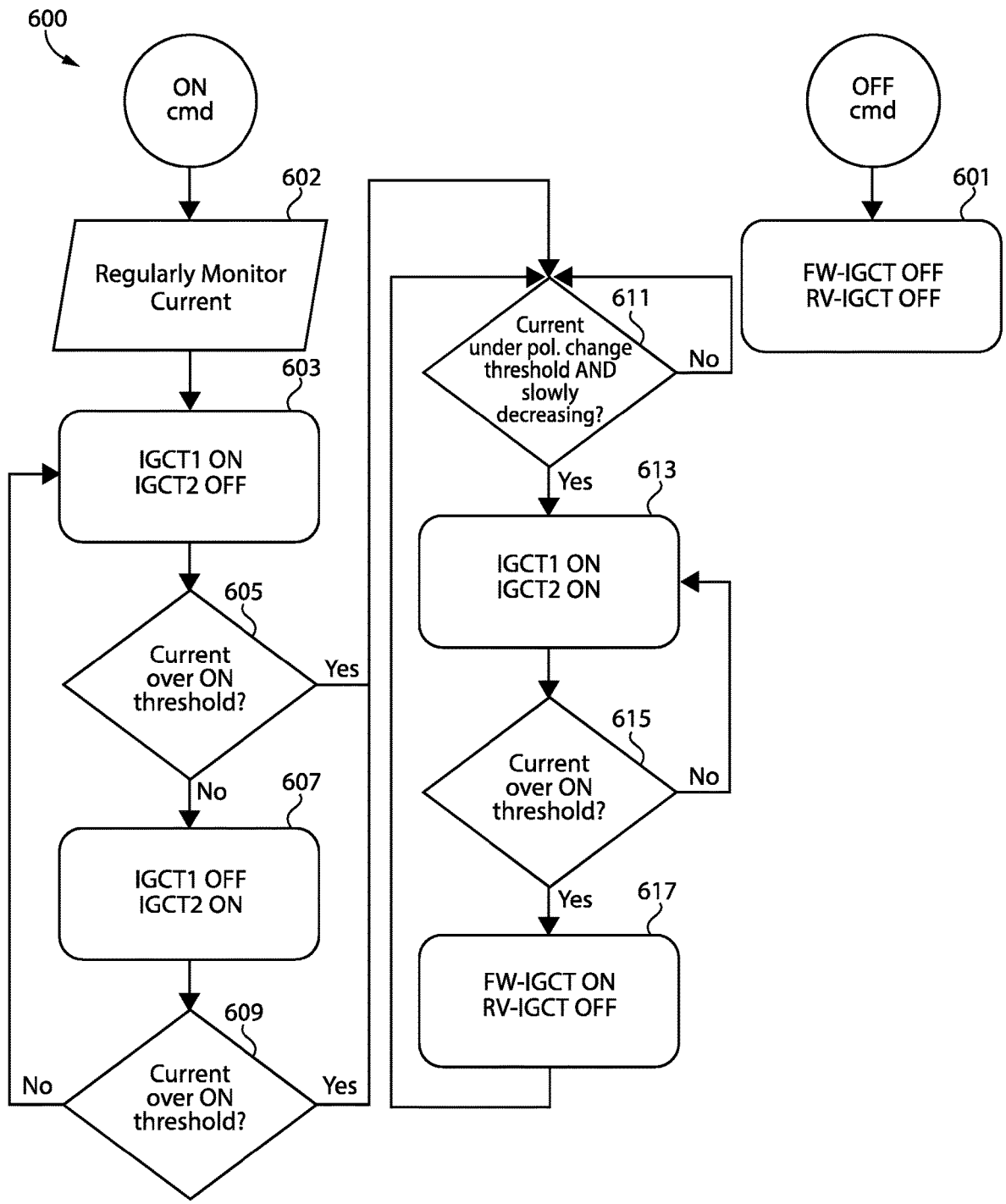

With reference to FIG. 6, there is illustrated an exemplary process 600 to open and close SSCB 100. To close SSCB 100, process 600 begins at operation 602 where controller 106 regularly measures current direction for the duration of process 600. Controller 106 may regularly measuring by continuously or periodically measuring current. For subsequent operations in process 600 where an RB-IGCT is operated depending on whether the RB-IGCT is a forward RB-IGCT or a reverse RB-IGCT, the operation uses the most recent current measurement to determine which RB-IGCT is the forward RB-IGCT and the reverse RB-IGCT.

Process 600 first determines the direction of the current flowing through SSCB 100 by executing at least some of operations 603 and 607 and conditionals 605 and 609. Process 600 begins at operation 603 where RB-IGCT 107 is turned on and RB-IGCT 105 is turned off or left off. Process 600 then proceeds to conditional 605 where controller 106 determines whether the current magnitude exceeds a first ON threshold. For example, the first ON threshold may be in the range of 1%-10% of the nominal rated current flowing through SSCB 100. If current does exceed the threshold, process 600 proceeds to conditional 611. If current does not exceed the threshold, process 600 proceeds to operation 607 where RB-IGCT 105 is turned on and RB-IGCT 107 is turned off. Process 600 then proceeds to conditional 609 where controller 106 determines whether current is over a second ON threshold. For example, the second ON threshold may be in the range of 1%-10% of the nominal rated current. If current is over the ON threshold, process 600 proceeds to conditional 611. If current is not over the threshold, process 600 returns to operation 603. The above process is repeated at a low frequency, such as 2.5-10 Hz to name but one example, until process 600 proceeds to conditional 611.

At conditional 611, controller 106 determines whether current is under a polarity-change threshold and slowly decreasing. For example, the polarity-change threshold may be in the range of 1%-10% of the nominal rated current of SSCB 100 and slowly decreasing may be a change in current over time less than 1 A/s. If the condition is not true, process 600 returns to conditional 611 and repeats conditional 611. If current is under a polarity-change threshold and slowly decreasing, process 600 proceeds to operation 613 where RB-IGCTs 105 and 107 are turned on. Process 600 then proceeds to conditional 615 where controller 106 determines whether current exceeds a third ON threshold. For example, the third ON threshold may be in the range of 5%-50% of nominal rated current. If current does not exceed the threshold, process 600 returns to operation 613. If current does exceed the threshold, process 600 proceeds to operation 617 where the reverse RB-IGCT is turned off. Process 600 then returns to conditional 611. To open SSCB 100, process 600 proceeds to operation 601 where RB-IGCTs 105 and 107 are turned off.

In certain embodiments, where SSCB 100 includes backup batteries, controller 106 manages reverse current flow in special cases. If controller 106 determines at conditional 611 that current is slowly decreasing and approaches zero while forward RB-IGCT is turned on, the reverse RB-IGCT is also turned on in preparation for polarity change. After that, the reverse RB-IGCT (previously the forward RB-IGCT) is turned off.

Figure 7:
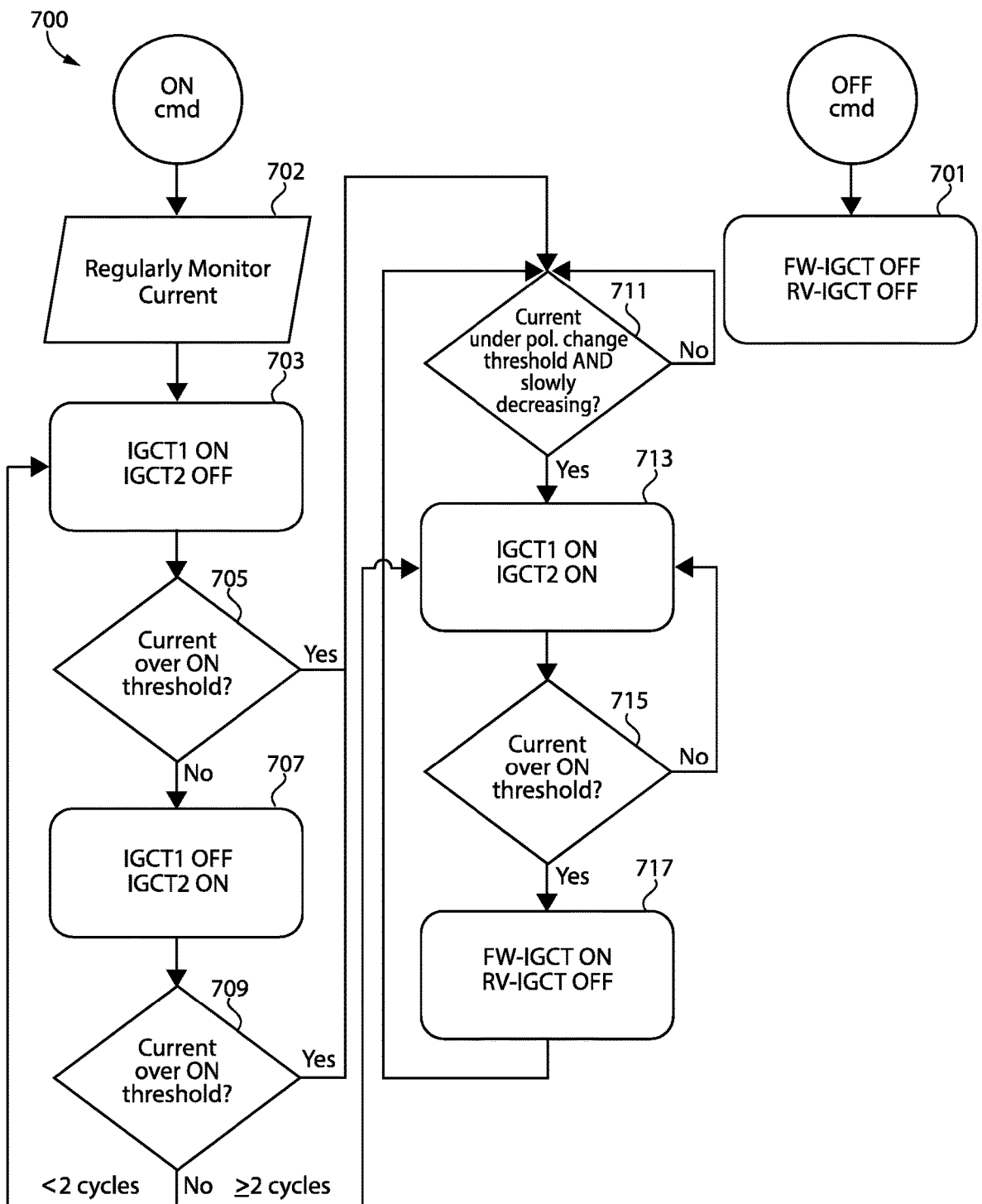

With reference to FIG. 7, there is illustrated an exemplary process 700 to open and close SSCB 100. To close SSCB 100, process 700 begins at operation 702 where controller 106 regularly measures current direction for the duration of process 700. Controller 106 may regularly measuring by continuously or periodically measuring current. For subsequent operations in process 700 where an RB-IGCT is operated depending on whether the RB-IGCT is a forward RB-IGCT or a reverse RB-IGCT, the operation uses the most recent current measurement to determine which RB-IGCT is the forward RB-IGCT and the reverse RB-IGCT.

Process 700 first determines the direction of the current flowing through SSCB 100 by executing a least some of operations 703 and 707 and conditionals 705 and 709. Process 700 begins at operation 703 where RB-IGCT 107 is turned on and RB-IGCT 105 is turned off or left off. Process 700 then proceeds to conditional 705 where controller 106 measures the current and determines whether the current magnitude exceeds a first ON threshold. For example, the first ON threshold may be in the range of 1%-10% of nominal rated current. If current does exceed the threshold, process 700 proceeds to conditional 711 with the reverse RB-IGCT turned off. If current does not exceed the threshold, process 700 proceeds to operation 707 where RB-IGCT 105 is turned on and RB-IGCT 107 is turned off. Process 700 then proceeds to conditional 709 where controller 106 measures the current and determines whether the current magnitude is over a second ON threshold. For example, the second ON threshold may be in the range of 1%-10%. If current is over the ON threshold, process 700 proceeds to conditional 711. If current is not over the threshold, process 700 returns to operation 709. If 700 repeats operation 803 to conditional 709 without determining at conditional 709 that the current is greater than the second ON threshold due to low current, process 700 proceeds to operation 713 where both RB-IGCTs are turned on.

At conditional 711, controller 106 determines whether current magnitude is under a polarity-change threshold and slowly decreasing. For example, the polarity-change threshold may be in the range of 1%-10% of the nominal rated current and slow decreasing may be a change in current over time less than 1 A/s. If the condition is not true, process 700 returns to conditional 711 and repeats conditional 711. If current magnitude is under a polarity-change threshold and slowly decreasing, process 700 proceeds to operation 713 where RB-IGCTs 105 and 107 are turned on. Process 700 then proceeds to conditional 715 where controller 106 determines whether current exceeds a third ON threshold. For example, the third ON threshold may be in the range of 5%-50% of nominal rated current. If current does not exceed the threshold, process 700 returns to operation 713. If current magnitude does exceed the threshold, process 700 proceeds to operation 717 where the reverse RB-IGCT is turned off. Process 700 then returns to conditional 711.

To open SSCB 100, process 700 proceeds to operation 701 where RB-IGCTs 105 and 107 are turned off. Depending on the state of the RB-IGCTs, only one may need to be turned off as the other RB-IGCT is already turned off.

Figure 8:
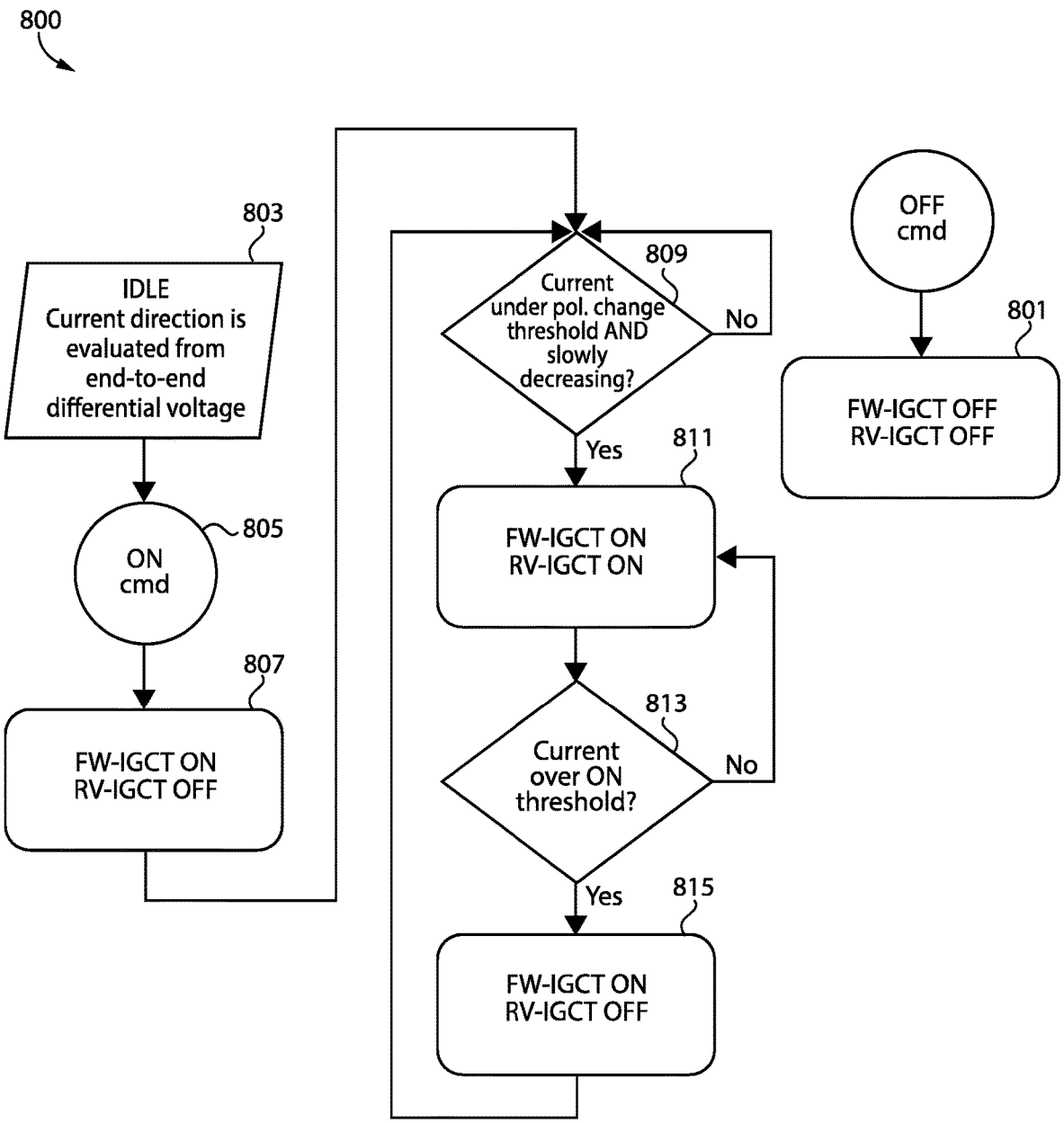

With reference to FIG. 8, there is illustrated an exemplary process 800 to open and close SSCB 100. Process 800 begins at operation 803 where controller 106 determines current direction using measuring devices such as voltage sensors coupled to terminals 101 and 103. Controller 106 determines the current flow direction using the voltage polarities and magnitudes detected by the voltage detectors. For the duration of process 800, controller 106 may regularly determine current direction by continuously or periodically measuring the voltage differential and determine the current direction using the measured voltage differential. For subsequent operations in process 800 where an RB-IGCT is operated depending on whether the RB-IGCT is a forward RB-IGCT or a reverse RB-IGCT, the operation uses the most recent voltage differential measurement to determine which RB-IGCT is the forward RB-IGCT and the reverse RB-IGCT.

Process 800 proceeds to operation 805 where controller 106 determines SSCB 100 should be closed. Process 800 proceeds to operation 807 where the forward RB-IGCT is turned on and reverse RB-IGCT is left off. Process 800 then proceeds to conditional 809.

At conditional 809, controller 106 determines whether current magnitude is under a polarity-change threshold and slowly decreasing. For example, the polarity-change threshold may be in the range of 1%-10% of the nominal rated current for SSCB 100 and slow decreasing may be a change in current over time less than 1 A/s. If the condition is not true, process 800 returns to conditional 809 and repeats conditional 809. If current is under a polarity-change threshold and slowly decreasing, process 800 proceeds to operation 811 where RB-IGCTs 105 and 107 are turned on. Process 800 then proceeds to conditional 813 where controller 106 determines whether current exceeds an ON threshold. For example, the ON threshold may be in the range of 5%-50% of nominal rated current for SSCB 100. If current does not exceed the threshold, process 800 returns to operation 811 where the forward RB-IGCT and the reverse RB-IGCT remain turned on. If current magnitude does exceed the threshold, process 800 proceeds to operation 815 where reverse RB-IGCT is turned off. Process 800 then returns to conditional 809.

To open SSCB 100, process 800 proceeds to operation 801 where RB-IGCTs 105 and 107 are turned off. Depending on the state of the RB-IGCTs, only one may need to be turned off as the other is already turned off.

In certain embodiments, operation 803 includes measuring voltage at low voltage for high resolution at a zero current crossing, clamping of the high voltage by MOV 109 to have high resolution at low voltage (e.g. +3/−3V), and using the build-up of negative voltage at zero current crossing to trigger the reverse IGCT and vice versa.

Figure 9:
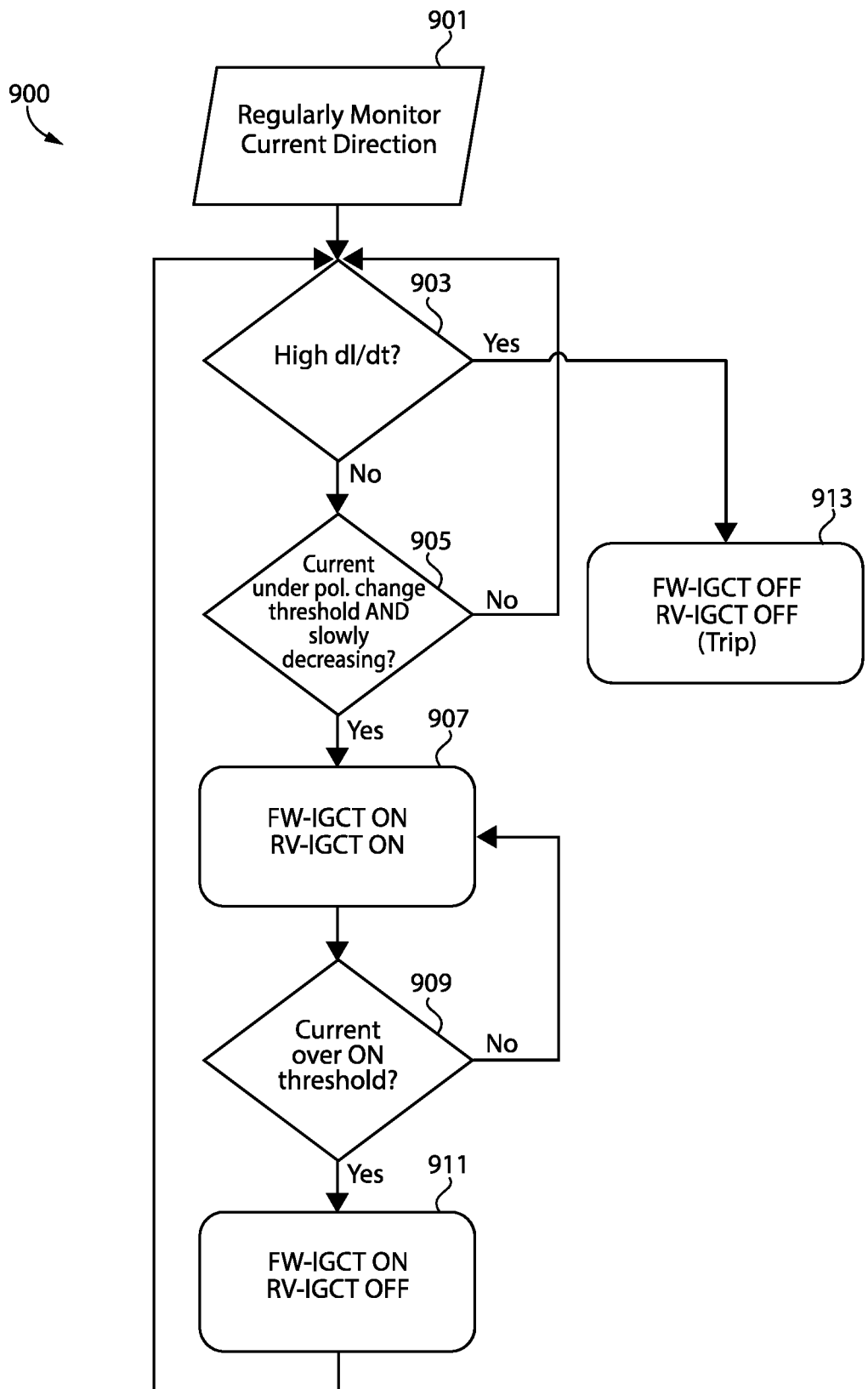

With reference to FIG. 9, there is illustrated an exemplary process 900 to open and close SSCB 100. Process 900 begins at operation 902 where controller 106 regularly determines current direction for the duration of process 900. Controller 106 may regularly determine current direction by continuously or periodically measuring current and determining current direction using the measured current. For subsequent operations in process 900 where an RB-IGCT is operated depending on whether the RB-IGCT is a forward RB-IGCT or a reverse RB-IGCT, the operation uses the most recent current direction determination.

Process 900 proceeds to conditional 903 where controller 106 determines whether a change in current over time exceeds a threshold. For example, the threshold may be in a range of 10-100 A/μs. If change in current over time exceeds the threshold, process 900 proceeds to operation 913 where RB-IGCTs 105 and 107 are turned off. The change in current threshold is configured to distinguish between normal current inversion and a current inversion because of a short-circuit fault condition.

If the current gradient does not exceed the threshold, process 900 proceeds to conditional 905. At conditional 905, controller 106 determines whether current is under a polarity-change threshold and slowly decreasing. For example, the polarity-change threshold may be in the range of 1%-10% of the nominal rated current and slowly decreasing may be a change in current over time less than 1 A/s. If the condition is not true, process 900 returns to conditional 903 and repeats conditional 903. If current is under a polarity-change threshold and slowly decreasing, process 900 proceeds to operation 907 where RB-IGCTs 105 and 107 are turned on. Process 900 then proceeds to conditional 909 where controller 106 determines whether current exceeds an ON threshold. For example, the ON threshold may be in the range of 5%-50% of nominal rated current. If current does not exceed the threshold, process 900 returns to operation 907. If current does exceed the threshold, process 900 proceeds to operation 911 where reverse RB-IGCT is turned off. Process 900 then returns to conditional 903.

Further written description of a number of exemplary embodiments shall now be provided. One embodiment is a power switch comprising: a first reverse blocking integrated gate-commutated thyristor (RB-IGCT); a second RB-IGCT coupled in an antiparallel configuration with the first RB-IGCT; a transient voltage suppressor coupled in parallel with the first RB-IGCT and the second RB-IGCT; and a controller structured to determine a direction of a current flowing through the power switch, determine a magnitude of the current flowing through the power switch exceeds a threshold, and turn off the one of the first RB-IGCT and the second RB-IGCT receiving the current flowing in a reverse direction in response to determining the magnitude of the current flowing through the power switch exceeds the threshold.

In certain forms of the foregoing power switch the controller is structured to turn off the other RB-IGCT after a delay of a time period required for the other RB-IGCT to deplete a stored charge for load switching. In certain forms, determining the direction of the current flowing through the power switch includes determining the first RB-IGCT is receiving the current flowing in a forward direction, and wherein turning off the one of the first RB-IGCT and the second RB-IGCT includes turning off the second RB-IGCT. In certain forms, the controller is structured to turn on the second RB-IGCT such that both the first RB-IGCT and the second RB-IGCT are turned on in response to determining the current flowing through the first RB-IGCT is less than a polarity change threshold and decreasing, and wherein the first and second RB-IGCTs are turned on before the controller determines the magnitude of the current flowing through the power switch exceeds the threshold. In certain forms, determining the direction of the current flowing through the power switch includes cyclically turning on the first RB-IGCT, measuring the magnitude of the current flowing through the first RB-IGCT, turning off the first RB-IGCT, turning on the second RB-IGCT, measuring the magnitude of the current flowing through the second RB-IGCT, and turning off the second RB-IGCT until the measured magnitude of the current flowing through the first RB-IGCT or second RB-IGCT exceeds the threshold. In certain forms, determining the direction of the current flowing through the power switch includes measuring a differential voltage using a voltage sensor coupled to a first terminal of the power switch and a voltage sensor coupled to a second terminal of the power switch. In certain forms, the controller is structured operate the first and second RB-IGCTs such that both the first RB-IGCT and the second RB-IGCT are turned on in response to determining the current flowing through the first RB-IGCT is less than a polarity change threshold and decreasing, the first RB-IGCT and the second RB-IGCT being turned on before the controller determines the magnitude of the current flowing through the power switch exceeds the threshold. In certain forms, the controller is structured to measure the differential voltage at a zero current crossing. In certain forms, the controller is structured to turn off the first RB-IGCT and the second RB-IGCT in response to determining a short circuit condition is occurring, wherein the controller determines short circuit condition is occurring includes comparing a change in the current over time to a short circuit threshold. In certain forms, the power switch includes a solid state circuit breaker structured to interrupt a flow of medium voltage direct current or low voltage direct current.

Another exemplary embodiment is a method comprising: operating a power switch including a first reverse blocking integrated gate-commutated thyristor (RB-IGCT), a second RB-IGCT coupled in an antiparallel configuration with the first RB-IGCT, a transient voltage suppressor coupled in parallel with the first RB-IGCT and the second RB-IGCT; and a controller; determining, with the controller, a direction of a current flowing through the power switch; determining a magnitude of the current flowing through the power switch exceeds a threshold; and turning off the one of the first RB-IGCT and the second RB-IGCT receiving a current flowing in a reverse direction in response to determining the magnitude of the current flowing through the power switch exceeds the threshold.

In certain forms of the foregoing method, the method comprises turning off the other RB-IGCT after a delay of a time period required for the other RB-IGCT to deplete a stored charge for load switching. In certain forms, determining the direction of the current flowing through the power switch includes determining the first RB-GCT is receiving current flowing in a forward direction, and wherein turning off the one of the first RB-IGCT and the second RB-IGCT includes turning off the second RB-IGCT. In certain forms, the method comprises turning on the second RB-IGCT such that both the first RB-IGCT and the second RB-IGCT are turned on in response to determining the current flowing through the first RB-IGCT is less than a polarity change threshold and decreasing, and wherein the first and second RB-IGCTs are both turned on before determining the magnitude of the current flowing through the power switch exceeds the threshold. In certain forms, determining the direction of the current flowing through the power switch includes cyclically turning on the first RB-IGCT, measuring the magnitude of the current flowing through the first RB-IGCT, turning off the first RB-IGCT, turning on the second RB-IGCT, measuring the magnitude of the current flowing through the second RB-IGCT, and turning off the second RB-IGCT until the measured magnitude of the current flowing through the first RB-IGCT or second RB-IGCT exceeds the second threshold. In certain forms, determining the direction of the current flowing through the power switch includes measuring a differential voltage using a voltage sensor coupled to a first terminal of the power switch and a voltage sensor coupled to a second terminal of the power switch. In certain forms, operating the first and second RB-IGCTs such that both the first RB-IGCT and the second RB-IGCT are turned on in response to determining the current flowing through the first RB-IGCT is less than a polarity change threshold and decreasing, the first RB-IGCT and the second RB-IGCT being both turned on before determining the magnitude of the current flowing through the power switch exceeds the threshold. In certain forms, measuring the differential voltage occurs during a zero current crossing. In certain forms, the method comprises turning off the first RB-IGCT and the second-IGCT in response to determining a short circuit condition is occurring, and wherein determining a short circuit condition is occurring includes comparing a change in the current over time to a short circuit threshold. In certain forms, the power switch includes a solid state circuit breaker structured to interrupt a flow of medium voltage direct current or low voltage direct current.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A power switch comprising:
 a first reverse blocking integrated gate-commutated thyristor (RB-IGCT);
 a second RB-IGCT coupled in an antiparallel configuration with the first RB-IGCT;
 a transient voltage suppressor coupled in parallel with the first RB-IGCT and the second RB-IGCT; and
 a controller structured to determine a direction of a current flowing through the power switch, determine one of the first RB-IGCT or the second RB-IGCT is receiving the current flowing in a forward direction, turn on the other of the first RB-IGCT or the second RB-IGCT such that both the first RB-IGCT and the second RB-IGCT is turned on in response to determining the current flowing through the first RB-IGCT is less than a polarity change threshold and decreasing, and wherein the first and second RB-IGCTs are turned on before the controller determines a magnitude of the current flowing through the power switch exceeds the threshold, and when the controller determines the magnitude of the current flowing through the power switch exceeds a threshold, turn off the one of the first RB- IGCT or the second RB-IGCT receiving the current flowing in a reverse direction in response to determining the magnitude of the current flowing through the power switch exceeds the threshold.

2. The power switch of claim 1, wherein the controller is structured to turn off the one of the first RB-IGCT or the second RB-IGCT after a delay of a time period required for the other RB-IGCT to deplete a stored charge for load switching.

3. The power switch of claim 1, wherein determining the direction of the current flowing through the power switch includes cyclically turning on the first RB-IGCT, measuring the magnitude of the current flowing through the first RB-IGCT, turning off the first RB-IGCT, turning on the second RB-IGCT, measuring the magnitude of the current flowing through the second RB-IGCT, and turning off the second RB-IGCT until the measured magnitude of the current flowing through the first RB-IGCT or second RB-IGCT exceeds the threshold.

4. The power switch of claim 1, wherein determining the direction of the current flowing through the power switch includes measuring a differential voltage using a voltage sensor coupled to a first terminal of the power switch and a voltage sensor coupled to a second terminal of the power switch.

5. The power switch of claim 4, wherein the controller is structured operate the first and second RB-IGCTs such that both the first RB-IGCT and the second RB-IGCT are turned on in response to determining the current flowing through the first RB-IGCT is less than a polarity change threshold and decreasing, the first RB-IGCT and the second RB-IGCT being turned on before the controller determines the magnitude of the current flowing through the power switch exceeds the threshold.

6. The power switch of claim 4, wherein the controller is structured to measure the differential voltage at a zero current crossing.

7. The power switch of claim 1, wherein the controller is structured to turn off the first RB-IGCT and the second RB-IGCT in response to determining a short circuit condition is occurring, wherein the controller determines short circuit condition is occurring includes comparing a change in the current over time to a short circuit threshold.

8. The power switch of claim 1, wherein the power switch includes a solid state circuit breaker structured to interrupt a flow of medium voltage direct current or low voltage direct current.

9. A method comprising:
operating a power switch including a first reverse blocking integrated gate-commutated thyristor (RB-IGCT), a second RB-IGCT coupled in an antiparallel configuration with the first RB-IGCT, a transient voltage suppressor coupled in parallel with the first RB-IGCT and the second RB-IGCT; and a controller;
determining, with the controller, a direction of a current flowing through the power switch;
determining, with the controller, one of the first RB-IGCT or the second RB-IGCT is receiving the current flowing in a forward direction;
turning on the other of the first RB-IGCT or the second RB-IGCT such that both the first RB-IGCT and the second RB-IGCT is turned on in response to determining the current flowing through the first RB-IGCT is less than a polarity change threshold and decreasing, and wherein the first and second RB-IGCTs are turned on before the controller determines a magnitude of the current flowing through the power switch exceeds the threshold;
determining the magnitude of the current flowing through the power switch exceeds a threshold; and
turning off the one of the first RB-IGCT or the second RB-IGCT receiving a current flowing in a reverse direction in response to determining the magnitude of the current flowing through the power switch exceeds the threshold.

10. The method of claim 9, comprising turning off one of the first RB-IGCT and the second RB-IGCT after a delay of a time period required for the other RB-IGCT to deplete a stored charge for load switching.

11. The method of claim 9, wherein determining the direction of the current flowing through the power switch includes cyclically turning on the first RB-IGCT, measuring the magnitude of the current flowing through the first RB-IGCT, turning off the first RB-IGCT, turning on the second RB-IGCT, measuring the magnitude of the current flowing through the second RB-IGCT, and turning off the second RB-IGCT until the measured magnitude of the current flowing through the first RB-IGCT or second RB-IGCT exceeds the second threshold.

12. The method of claim 9, wherein determining the direction of the current flowing through the power switch includes measuring a differential voltage using a voltage sensor coupled to a first terminal of the power switch and a voltage sensor coupled to a second terminal of the power switch.

13. The method of claim 12, operating the first and second RB-IGCTs such that both the first RB-IGCT and the second RB-IGCT are turned on in response to determining the current flowing through the first RB-IGCT is less than a polarity change threshold and decreasing, the first RB-IGCT and the second RB-IGCT being both turned on before determining the magnitude of the current flowing through the power switch exceeds the threshold.

14. The method of claim 12, wherein measuring the differential voltage occurs during a zero current crossing.

15. The method of claim 9, comprising turning off the first RB-IGCT and the second RB-IGCT in response to determining a short circuit condition is occurring, and wherein determining the short circuit condition is occurring includes comparing a change in the current over time to a short circuit threshold.

16. The method of claim 9, wherein the power switch includes a solid state circuit breaker structured to interrupt a flow of medium voltage direct current or low voltage direct current.

* * * * *